United States Patent Office 3,234,088
Patented Feb. 8, 1966

3,234,088
PYRIDYL BENZIMIDAZOLE ANTHELMINTIC COMPOSITIONS AND METHODS OF USING SAME
Lewis H. Sarett, Princeton, and Horace D. Brown, Plainfield, N.J., assignors to Merck & Co., Inc., Rahway, N.J., a corporation of New Jersey
No Drawing. Filed May 15, 1963, Ser. No. 280,742
7 Claims. (Cl. 167—53)

This invention is directed to the treatment of parasites. Broadly, it is directed to a new group of anthelmintic compounds. It is also concerned with new compositions which are useful in the treatment of helminthiasis. Further, it is concerned with new methods of employing such compounds and compositions in the treatment and prevention of helminthiasis. It relates further to methods of preparing novel anthelmintic compositions and, more specifically, it is directed to the use of 2-pyridyl benzimidazoles, to compositions containing them, and to their use as anthelmintics.

The infection known as helminthiasis involves infestation of the animal body, and particularly the gastro-intestinal tract, with parasitic worms known as helminths. The disease is a widespread and serious one causing economic difficulties and losses in industries concerned with the raising of animals, such as swine, sheep, cattle, goats and poultry. Methods heretofore available for the treatment and prevention of helminthiasis have not been entirely satisfactory. Compounds such as hygromycin, phenothiazine, piperazine, and derivatives thereof have been described as useful in the treatment of this disease. However, each suffers from various drawbacks such as undesirable side effects when administered continuously in large doses. Others operate against only a few of the many individual species of helminths. Additionally, certain of these parasitic worms have developed resistance to a number of the anthelmintic compounds heretofore available.

It is an object of the present invention to provide a new group of anthelmintic agents. It is another object to provide anthelmintic compositions and methods of employing such compositions in the treatment and prevention of helminthiasis. A further object of this invention is to provide methods for preparing such anthelmintic compositions.

According to the present invention, it has now been found that 2-pyridyl benzimidazoles are highly effective anthelmintics and may be effectively employed in the treatment and/or prevention of helminthiasis. Some of the 2-pyridyl benzimidazoles found to possess anthelmintic properties are known, e.g., 2-(α-pyridyl) benzimidazole and 2-(β-pyridyl) benzimidazole, and all may be conveniently prepared according to methods described in the literature.

Acid addition salts are sometimes preferred over the free bases for treatment of helminthiasis. The salts are conveniently prepared by intimately contacting the base with a molar excess of acid. Although many of the salts are more soluble in water or polar solvents, such as lower alkanols than are the corresponding bases, the salts are readily crystallized from such solvents as alcohol-ether or acetone. Typical salts of the 2-pyridyl benzimidazoles that may be effectively employed as anthelmintic agents are mineral acid salts such as the hydrochloride, hydrobromide, hydroiodide, sulfate, nitrate, phosphate and the like, salts of aliphatic acids such as the acetate, propionate, trimethylacetate and t-butylacetate, salts of polycarboxylic acids such as the stearate, oxylate, succinate and the like, and salts of other insoluble organic acids. It is preferred to employ the mineral acid addition salts since they appear to be the most stable form. It is, of course, desirable that the particular salt be non-toxic to the animal to which it is given at the dose level employed.

As discussed more fully hereafter, the 2-pyridyl benzimidazoles of the inevntion are intimately dispersed in the suitable readily administrable carrier vehicle and used as anthelmintics. Although each exhibits a somewhat different degree of activity all are effective in treating helminthiasis. The preferred dosage level for treating helminthiasis infection will depend to a large extent on the particular 2-pyridyl benzimidazole being employed, on the severity of the infection, and on the particular species of animal to be treated. The 2-pyridyl benzimidazoles of the invention exhibit anthelmintic activity when administered to animals in a daily dose of about 1000 mg./kg. of animal body weight. It is preferred to employ about 200–700 mg./kg. of body weight per day. The compounds may be given in a single dose or divided into a plurality of smaller doses. Highly satisfactory results in freeing the animal of helminths are achieved by administering the compounds of this invention for about a single day at the above levels. The optimum daily dose level may be lowered if the course of treatment is extended over a period of days.

When the compounds are to be employed primarily as prophylactic agents for the prevention of helminthiasis infection, the preferred daily dose level is lower than the therapeutic level and is preferably in the range of about 10–200 mg./kg. of body weight. The compounds may be incorporated in the animal feedstuffs, and when the compounds are to be used prophylactically, this is a preferred method of administration. They are incorporated in the feeds at concentrations such that the animal's daily consumption will be in the range of the therapeutic dosage above mentioned.

The means employed for administering these benzimidazoles to animals are not critical and any of the methods now used or available for treating animals infected with or susceptible to parasitic infections are satisfactory for treating helminthiasis. When used therapeutically, these systems are conveniently administered in a unit dosage form such as in a capsule, bolus, tablet or as a liquid drench. It will be noted that all of these methods contemplate oral administration, since this is the most effective method of treating the worm infected stomach or intestinal tract.

When the 2-pyridyl benzimidazoles are to be administered in dry, solid unit dosage form, capsules, boluses, or tablets containing the desired amount of anthelmintic distributed in the pharmaceutically acceptable vehicle are usually employed. These are prepared by intimately and uniformly mixing the active ingredients with suitable finely divided diluents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired and the severity and type of parasitic infestation. For large animals such as sheep, swine, or cattle, boluses weighing up to 15 grams may be used although it is preferred to employ boluses weighing from 5–10 grams and containing from 2–8 grams of the 2-pyridyl benzimidazole. These boluses as well as smaller size tablets contain binders and lubricants, and are compounded by techniques known in this art. Capsules are readily prepared by mixing the active ingredient with a diluent such as starch or lactose and filling into the capsule.

In order to treat infected animals by means of a drench, the 2-pyridyl benzimidazoles are mixed with a suspending agent such as bentonite and the solid product added to water just prior to administration. Alternatively, ready to use drench formulations are sometimes utilized. The preferred drenches in accordance with this invention contain from about 5–50% by weight of 2-pyridyl benzimidazole compound.

The 2-pyridyl benzimidazoles may also be administered as a component of the animal feed or dissolved or suspended in drinking water. The compounds described above may be intimately dispersed in or mixed with an inert carrier and diluent. The term inert carrier is intended to mean one that is non-reactive with respect to the 2-pyridyl benzimidazole, and which, in addition, may be safely administered to the animals. The carrier or diluent is preferably one that is or may be an ingredient of the animal ration.

These compositions include feed supplements in which the active ingredient is present in relatively large amounts and which are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 5% to about 50% by weight, and preferably from about 10–30% by weight of active ingredient are particularly suitable for addition to feeds. The active compound is normally dispersed or mixed uniformly in the diluent but in some instances may be absorbed on the carrier.

These supplements are added to the finished animal feed in an amount adequate to give the final concentration desired for controlling or terating helminthiasis by way of the animal ration. Although the preferred level in feeds will depend on the particular compound being employed, the 2-pyridyl benzimidazoles of this invention are normally fed at levels of 0.5–2.0% in the feed. One advantageous method of administering the compounds of this invention to animals whose feeds are conveniently pelleted, such as sheep, is to incorporate them directly in the pellets. For instance, 2-pyridyl benzimidazole is readily incorporated in nutritionally adequate alfalfa pellets (during the pelleting operation) at levels of 1 to 5 grams per pound of pellets for therapeutic use, and at lower levels for prophylactic use, and such pellets fed to the worm-infested animals. Alternatively, the 2-pyridyl benzimidazoles may be incorporated in salt licks or salt blocks at any desired concentartion (concentrations of 5–25% by weight are conveniently employed). Large animals, such as sheep, cattle, and swine, then receive the anthelmintics with their salt.

The following examples are given for the purpose of illustration and not by way of limitation:

*Example 1*

When the 2-pyridyl benzimidazoles listed below are orally ingested by mice infested with the nematode *Nematospiroides dubius*, development of the nemotode's larvae is prevented at the dose rate indicated.

| | Dose in mg./kg. |
|---|---|
| 2-($\alpha$-pyridyl) benzimidazole | 500 |
| 2-($\beta$-pyridyl) benzimidazole | 125 |

*Example 2*

Typical feed supplements containing a 2-pyridyl benzimidazole dispersed in solid carrier are:

(A)

| | Lbs. |
|---|---|
| 2-($\alpha$-pyridyl) benzimidazole | 20.0 |
| Corn distillers' dried grains | 80.0 |

(B)

| | |
|---|---|
| 2-($\beta$-pyridyl) benzimidazole hydrochloride | 5.0 |
| Wheat standard middling | 95.0 |

(C)

| | |
|---|---|
| 2-($\alpha$-pyridyl) benzimidazole | 35.0 |
| Wheat shorts | 65.0 |

(D)

| | |
|---|---|
| 2-($\beta$-pyridyl) benzimidazole | 50.0 |
| Corn distillers' grains | 50.0 |

*Example 3*

A liquid drench can be prepared according to the following formulation.

| | | |
|---|---|---|
| 2-($\alpha$-pyridyl) benzimidazole | grams | 2.3 |
| Benzalconium chloride (12.8%) | do | 0.6 |
| Antifoam AF emulsion | do | .06 |
| Hydroxyethyl cellulose | do | 0.3 |
| Distilled water | ml | 30.0 |

*Example 4*

Boluses of 2-($\alpha$-pyridyl) benzimidazole suitable for oral administration to domesticated animals are prepared having the following composition:

| | (A) Gm. | (B) Gm. |
|---|---|---|
| 2-($\alpha$-pyridyl) benzimidazole | 2.0 | 4.0 |
| Dicalcium phosphate | 3.0 | 1.0 |
| Starch | 0.535 | 0.702 |
| Guar gum | 0.15 | 0.16 |
| Talc | 0.14 | 0.11 |
| Magneisum stearate | 0.04 | 0.028 |

A. To prepare A above, the dicalcium phosphate is thoroughly mixed with the 2-($\alpha$-pyridyl) benzimidazole and the mixture reduced to a particle size finer than 60 mesh. To the mixture is added 0.330 gm. of starch in the form of an aqueous starch paste and the resulting mixture granulated in the usual manner. The granules are then passed through a #10 mesh screen and dried at 110°–130° F. for about 8 hours, and the dried material then passed through a #16 mesh screen. The guar gum and the balance of the starch are added and the mixture thoroughly blended. The remainder of the ingredients are then added and the whole thoroughly mixed and compressed.

B. Preparation B is made by thoroughly mixing the dicalcium phosphate with the 2-($\alpha$-pyridyl) benzimidazole and reducing the mixture to a particle size finer than 60 mesh. To the mixture is added 0.430 gm. of starch in the form of an aqueous starch paste and the resulting mixture is then granulated in the usual manner. The granules are passed through a #10 mesh screen and dried at 110°–130° F. for about 8 hours, and the dried material then passed through a #16 mesh screen. The guar gum and the balance of the starch are added and the mixture thoroughly blended. The remainder of the ingredients are then added and the whole thoroughly mixed and compressed.

*Example 5*

A tablet having the following composition

| | Mg. |
|---|---|
| 2-($\beta$-pyridyl) benzimidazole | 250 |
| Dicalcium phosphate | 250 |
| Starch | 125 |
| Guar gum (60 mesh) | 17 |
| Talc (60 mesh) | 14 |
| Magnesium stearate (60 mesh) | 5 | is prepared in the following manner:

The dicalcium phosphate, 2-(β-pyridyl) benzimidazole and 50 mg. of starch are thoroughly mixed and the mixture reduced to a particle size finer than 60 mesh. 45 mg. of starch in the form of an aqueous starch paste is added to the mixture and the whole granulated in the usual manner. The granules are then passed through a #10 mesh screen and dried at 110°–130° F. for about 8 hours. The dried material is then passed through a #16 mesh screen. The guar gum and the balance of the starch are added and the mixture thoroughly blended. The remainder of the ingredients are then added and the mass mixed and compressed.

It should be understood that although this invention has been described with reference to particular embodiments thereof, changes and modifications may be made which are within its intended scope and it should be limited only by the language of the appended claims.

We claim:

1. A method of controlling helminth infections in animals that comprises orally administering to said animal an anthelmintically effective amount of anthelmintic composition containing a compound selected from the group consisting of 2-(pyridyl) benzimidazole and non-toxic acid addition salts thereof.

2. A method according to claim 1 wherein the 2-(pyridyl) benzimidazole is 2-(α-pyridyl) benzimidazole.

3. A method according to claim 1 wherein the 2-(pyridyl) benzimidazole is 2-(β-pyridyl) benzimidazole.

4. An anthelmintic composition comprising an animal feed having distributed therein as an active anthelmintic agent a compound selected from the group consisting of 2-(α-pyridyl) benzimidazole and 2-(β-pyridyl) benzimidazole in a concentration greater than about 0.5% by weight.

5. An anthelmintic composition comprising an animal feed having distributed therein an anthelmintically effective amount of a compound selected from the group consisting of 2-(α-pyridyl)-benzimidazole and 2-(β-pyridyl)-benzimidazole, said benzimidazole being present in a concentration sufficient to provide a daily intake of from about 10 mg. to about 1000 mg. of said benzimidazole per kilogram of animal body weight.

6. An anthelmintic composition comprising a liquid drench vehicle containing a suspending agent and an anthelmintically effective amount of a compound selected from the group consisting of 2-(α-pyridyl)-benzimidazole, 2-(β-pyridyl)-benzimidazole, and non-toxic acid addition salts thereof, the concentration of said compound being adequate to supply in a single daily dose from about 10–1000 mg. of said compound per kilogram of animal body weight.

7. An anthelmintic composition comprising a liquid drench vehicle containing a suspending agent and an anthelmintically effective amount of 2-(β-pyridyl)-benzimidazole, the concentration of said compound being adequate to supply in a single daily dose from about 10–1000 mg. of said compound per kilogram of animal body weight.

References Cited by the Examiner

FOREIGN PATENTS 949,059   9/1956   Germany.

OTHER REFERENCES

Jerchel, Chem. Abst., vol. 47, 1953, pages 2752 and 2753.

JULIAN S. LEVITT, *Primary Examiner.*

SAM ROSEN, *Assistant Examiner.*